US012810823B2

(12) United States Patent
Norman

(10) Patent No.: US 12,810,823 B2
(45) Date of Patent: Nov. 24, 2026

(54) PIANO STRING FRAME

(71) Applicant: 1066 GROUP LTD, Cambridge (GB)

(72) Inventor: Alistair Mark Norman, Cambridge (GB)

(73) Assignee: 1066 GROUP LTD, Cambridge (GB)

( * ) Notice: Subject to any disclaimer, the term of this patent is extended or adjusted under 35 U.S.C. 154(b) by 302 days.

(21) Appl. No.: 18/770,315

(22) Filed: Jul. 11, 2024

(65) Prior Publication Data

US 2025/0022442 A1 Jan. 16, 2025

(30) Foreign Application Priority Data

Jul. 11, 2023 (GB) ..................................... 2310609

(51) Int. Cl.
*G10C 3/04* (2006.01)

(52) U.S. Cl.
CPC ..................................... *G10C 3/04* (2013.01)

(58) Field of Classification Search
CPC ... G10C 3/04; G10C 1/04; G10C 3/00; G10C 1/00
See application file for complete search history.

(56) References Cited

U.S. PATENT DOCUMENTS 1,146,433 A * 7/1915 Lane ........................ G10C 3/04 84/186.1
2,048,368 A 7/1936 Bilhuber
2012/0174727 A1 7/2012 Overs
2017/0301320 A1 10/2017 Dain

FOREIGN PATENT DOCUMENTS

GB 232416 4/1925

* cited by examiner

*Primary Examiner* — Kimberly R Lockett
(74) *Attorney, Agent, or Firm* — Heslin Rothenberg Farley & Mesiti P.C.

(57) ABSTRACT

A piano string frame comprising a frame plate having a perimeter portion enclosing an aperture, and a strut bisecting the aperture. The perimeter portion has a bass pin portion to support a first end of a plurality of bass strings; a bass hitch portion to support a second end of a plurality of bass strings; a treble pin portion to support a first end of a plurality of treble strings; and a treble hitch portion. To support a second end of a plurality of treble strings. The strut extends from a first point to a second point. The second point is disposed at an end of the treble hitch portion to support a second end of a lowest pitched treble string, such that the strut is underneath any bass strings supported by the piano string frame, and such that no part of the frame plate is disposed over any strings.

15 Claims, 3 Drawing Sheets

PIANO STRING FRAME

CROSS REFERENCE TO RELATED APPLICATIONS

This application claims priority benefit from Great Britain Application No. 2310609.9 filed on Jul. 11, 2023, entitled "Piano String Frame", which is incorporated herein by reference in its entirety.

FIELD OF THE INVENTION

The present invention relates to string frames for musical instruments and, in particular, to piano string frames.

BACKGROUND TO THE INVENTION

A piano string frame exists to support strings of a piano. The strings are held under high tension such that each string produces a required note when struck by a hammer, typically a small felted mallet. The piano string frame is responsible for sustaining the tension of the strings of the piano.

Accordingly, the piano string frame must withstand significant compression and bending forces exerted by the strings. Traditional piano string frames formed of wood would bend and warp under high tension. Modern piano string frames formed from metal enable much higher string tensions to be achieved safely, e.g. without buckling, and without compromising on tuning stability e.g. without deflection. Further, to improve a performance of a piano, it is preferable that a great volume of open space be provided to strings in use. Accordingly, there is a need for a piano string frame that provide strength and stiffness while offering minimal obstruction to the strings.

Nowadays, conventional piano string frames are formed from cast iron. This material is strong and designs comprising stress bars or braces provide sturdy support to the piano strings. However, casting is a multi-stage, often expensive, manufacturing process requiring specialist equipment and skills. Cast parts require the prior preparation of a pattern and a mould. Cast parts are produced at a specialist foundry where melted iron is poured into the mould and cooled through various stages of heat treatment such as annealing, quenching, or tempering for example. Finally, cast parts often require post processing to remove sprues, runners and flash, and/or to machine special features required for assembly such as holes for bolts.

Due to the specialised equipment and skills required to produce cast parts, availability is limited. In particular, increasingly few specialist iron casting foundries may be found in the UK these days. Accordingly, cast iron piano string frames are becoming increasingly expensive and unavailable.

Objects and aspects of the present claimed invention seek to alleviate at least these problems with the prior art.

SUMMARY OF THE INVENTION

At its most general, the present invention provides a piano string frame configured to support a plurality of piano strings, and comprising a frame plate and two beams. The frame plate is configured to provide mounting points for a plurality of piano strings and comprises an outer perimeter portion enclosing an aperture and a strut configured to span the aperture to split the aperture into two apertures. The beams are configured to reinforce the frame plate such that the piano string frame is sufficiently strong and stiff to support a plurality of piano strings without deflecting, bending or buckling. The first beam is disposed at an edge of the perimeter portion and the second beam extends from the first beam along the strut. This combination of frame plate and beams means that no bars, beams or struts spanning the aperture above any strings are required to provide a strong, stiff and stable piano string frame. Accordingly, a large open space is provided above any strings supported by the piano string frame and, in this way, a performance of a piano comprising the piano string frame may be consistently improved.

According to a first aspect of the invention, there is provided a piano string frame comprising: a frame plate comprising a perimeter portion enclosing an aperture, and a strut bisecting the aperture; the perimeter portion comprising: a bass pin portion configured to support a first end of a plurality of bass strings; a bass hitch portion configured to support a second end of a plurality of bass strings; a treble pin portion configured to support a first end of a plurality of treble strings; and a treble hitch portion configured to support a second end of a plurality of treble strings; and the strut being configured to extend from a first point disposed between the bass pin portion and the treble pin portion, to a second point; wherein the second point is disposed at an end of the treble hitch portion configured to support a second end of a lowest pitched treble string, such that the strut is disposed underneath any bass strings supported by the piano string frame, and such that no part of the frame plate is disposed over any strings; and a first beam disposed on the perimeter portion adjacent to the bass pin portion and the treble pin portion; and a second beam disposed to extend from the first beam along at least a part of the strut; wherein the first beam and the second beam are each connected to the frame plate via a welded joint.

The piano string frame is configured to support a plurality of piano strings. The piano string frame comprises a frame plate, a first beam and a second beam. The first beam and the second beam are disposed on the frame plate and connected to the frame plate via a welded joint. The frame plate is configured to provide a plurality of string terminating locations so as to define a length of each string of a plurality of piano strings. The first beam and the second beam are configured to provide strengthening and stiffening reinforcement to the frame plate to enable the piano string frame as a whole to withstand a tension exerted by a plurality of strings.

The frame plate comprises a perimeter portion enclosing an aperture and a strut bisecting the aperture. In other words, the frame plate comprises a substantially continuous outer frame edge defining a substantially central aperture, and a strut configured to connect two points on the outer frame edge through the aperture to split the aperture into two separate apertures. The two separate apertures may comprise a treble aperture disposed adjacent to the treble pin portion, and a bass aperture disposed adjacent to the bass pin portion. The frame plate may be formed of a plurality of separate plate parts which are coupled together to form the frame plate. For example, the frame plate may be formed of a hitch plate portion and a pin plate portion which may be connected via a welded joint to the first beam, the second beam and/or each other.

The frame plate may be formed from a substantially flat plate such that a thickness of the frame plate may be substantially consistent across the frame plate. For example, a thickness of the strut may be substantially identical to a thickness of the perimeter portion.

The perimeter portion comprises a bass pin portion, a bass hitch portion, a treble pin portion and a treble hitch portion. The bass pin portion and the bass hitch portion together support a plurality of bass strings. The treble pin portion and the treble hitch portion together support a plurality of treble strings. At the treble pin portion and the bass pin portion, strings may be secured by tuning pins and guided by agraffes. At the treble hitch portion and the bass hitch portion, strings may be supported by hitch pins.

The strut of the frame plate is configured to extend from a first point on a perimeter portion of the frame plate to a second point on a perimeter portion of the frame plate. The first point is disposed between the bass pin portion and the treble pin portion. The first point may be disposed at an edge of the aperture disposed between the bass pin portion and the treble pin portion. The strut may be configured to extend in a direction away from the first point. Accordingly, a terminus of the strut may be located at or near the first point. The strut may derive support from the first point via a web or other structure of the perimeter portion of the frame plate.

The second point may be disposed at an end of the treble hitch portion configured to support a second end of a lowest pitched treble string. In other words, the second point may be adjacent to an end of the treble hitch portion configured to support a treble string having a longest speaking length. The second point may be disposed at an edge of the aperture disposed at an end of the treble hitch portion configured to support a second end of a lowest pitched treble string. The second point may be located on an opposite side of the perimeter portion from the first point. The strut may be configured to extend in a direction away from the second point. Accordingly, a terminus of the strut may be located at or near the second point. The strut may derive support from the second point via a web or other structure of the perimeter portion of the frame plate.

The strut is disposed underneath any bass strings supported by the piano string frame. In other words, when a plurality of bass strings is supported by the bass pin portion and the bass hitch portion in use, the strut is disposed directly underneath at least some of the plurality of bass strings. That is to say, when the piano string frame is viewed from above in use, at least some of the plurality of bass strings cross over the strut.

Further, no part of the frame plate is disposed over any strings supported by the piano string frame in use. In other words, in use, when a plurality of treble strings and a plurality of bass strings are supported by the piano string frame, an entirety of the frame plate is disposed at a lower height that the entirety of any strings. Accordingly, any strings are provided a great volume of space within the piano string frame and an improved piano performance may be achieved.

In particular, by disposing all parts of the frame plate lower than any strings supported by the piano string frame, space is provided above the piano string frame for mechanism parts such as dampers. By providing a great volume of space for any strings supported by the piano string frame and for mechanism parts, a piano comprising the piano string frame may produce a loud sound for its size. In this way, a performance of the piano may be efficient. Further, by providing a great volume of space to any strings, sound originating from any string struck during playing may travel with less impedance to other strings and reverberate other strings to activate harmonics, improving a piano performance by increasing richness or depth, as well as extending sustain.

In addition, by providing a great volume of space within the piano string frame, a mechanism of a piano comprising the piano string frame may have more space and be less compact. As such, a mechanism may operate more reliably and efficiently.

Further, by keeping all parts of the frame plate below any strings supported by the piano string frame, a regulation i.e. maintenance and adjustment of mechanical parts of a piano to compensate for age and wear, and to increase a life span of a piano, may be easy. For example, parts requiring adjustment may be easily accessible and performing consistent alignment of parts may be simple.

A further advantage provided by a frame plate comprising no part disposed over any strings may be an improved aesthetic appeal. Pianists and/or spectators may have an unobstructed view of any piano strings and mechanism during playing which may improve a visual appeal of a piano performance.

The first beam is disposed on the perimeter portion of the frame plate adjacent to the bass pin portion and the treble pin portion. In other words, the first beam is disposed on an outer frame edge of the frame plate at the bass pin portion and the treble pin portion. The first beam may be disposed on the frame plate to define an outer edge of the perimeter portion, i.e. the first beam may be arranged flush with a boundary of the frame plate. In this way, the bass pin portion and the treble pin portion may be disposed closer to an aperture of the frame plate than the first beam.

In this way, the first beam may provide a strong and stiff structure to the frame plate near the bass pin portion and the treble pin portion. Piano strings may be terminated at the bass pin portion and the treble pin portion in use, accordingly a tension force exerted by the strings may be effectively reacted by a beam disposed in this area of the perimeter portion of the frame plate.

The second beam is disposed on the perimeter portion to extend from the first beam along at least a part of the strut. In other words, a first end of the second beam is disposed adjacent to the first beam and a second end of the second beam is disposed at a point along the strut. In this way, the second beam extends in a direction away from the first beam and towards the aperture. The second beam may be disposed above the strut such that the strut is arranged underneath the second beam. The second beam may be substantially straight. The second beam may have a length that is less than a length of the first beam. The second beam may have a height that is substantially identical to a height of the first beam.

The second beam may provide a strong and stiff structure to the frame plate along at least a part of the strut. In this way, the strut may be reinforced by the second beam. As the strut extends across the aperture, the strut may react a tension force exerted by piano strings on the frame plate in use. By reinforcing the strut with the second beam, the piano string frame as a whole may be stronger and stiffer. Accordingly, the piano string frame may be able to resist and withstand tension forces exerted by strings with less deflection, or strain, than if the second beam were not present. In this way, a stiff and stable piano string frame is provided without a need for further reinforcing bars, struts or similar components.

The first beam and the second beam may each have a height that extends above a height of any strings supported by the piano string frame. In this way, an upper surface of the first beam and/or an upper surface of the second beam may be arranged higher than part or all of the plurality of strings supported by the piano string frame. Accordingly, any lid of a piano may be closed onto an upper surface of the string frame without interfering with any strings.

Additionally, or alternatively, the first beam and the second beam are not arranged over any strings. That is to say, when the piano string frame is viewed from above in use no part of the first or second beam is arranged to overlap any strings. Accordingly, taking into account the arrangement of the frame plate, the first beam and the second beam, no part of the frame plate, the first beam and the second beam is disposed directly over any strings supported by the piano string frame in use. In other words, in use, when a plurality of treble strings and a plurality of bass strings are supported by the piano string frame, an entirety of the frame plate is disposed at a lower height that the entirety of any strings, and an entirety of the first beam and an entirety of the second beam are arranged adjacent to but not overlapping any strings. In this way, no part of the piano string frame is disposed directly over any strings. Accordingly, any strings are provided a great volume of space within the piano string frame and an improved piano performance may be achieved. The advantages discussed above of providing a great volume of space within the piano string frame by providing no part of the frame plate over any strings are advanced by an arrangement of the first and second beams not overlapping any strings and advanced by no part of the piano string frame being disposed directly over any strings.

The first beam and the second beam are connected to the frame plate by a welded joint. The first beam and the second beam may be connected to the bass pin portion and the treble pin portion of the frame plate by a welded joint. The second beam may be connected to the strut by a welded joint. The first and second beam may be connected to the frame plate by a plurality of welded joints. The welded joint or joints may provide a strong connection between the frame plate and the first beam, and the frame plate and the second beam. By providing welded joints, a structural integrity of the piano string frame may be maintained. Further, stress applied by any strings to the string frame may be more effectively distributed through welded joints than other types of joints, such as bolted joints. Accordingly, the piano string frame may be stiff, strong and stable as a result of using welded joints.

Advantageously, by providing welded joints a cost and complexity of manufacture of a piano string frame may be improved. Further an availability of manufacture of a piano string frame may be improved due to a simplicity of welded joints. Conventional piano string frames may comprise cast parts, requiring a complex, multi-stage manufacturing process which may involve pattern-making, moulding, casting and post-processing steps. By comparison, the manufacture of a welded piano string frame may be cheap, simple and widely available in the UK.

Accordingly, by providing a piano string frame according to a first aspect of the invention, a strong and stiff piano string frame providing a great volume of space to any strings for improved piano performance, that is cheap, simple and widely available to manufacture may be provided.

The treble hitch portion may be disposed substantially between the bass hitch portion and the bass pin portion to provide an over-strung piano string frame. Accordingly, any bass strings supported at the bass hitch portion and the bass pin portion may extend over the treble hitch portion and any treble strings supported by the treble hitch portion. In this way, any bass strings may be configured to cross over at least some of any treble strings, providing an over-strung piano string frame.

By providing an over-strung piano string frame, a size of a piano string frame may be reduced. An improved compactness of the piano string frame may reduce a cost of the piano string frame. Further, an over-strung piano string frame may be more versatile as a great variety of overall shapes of the piano string frame and piano may be compatible with an over-strung piano string frame.

In addition, an over-strung piano string frame may provide a greater string length, and thereby a larger sound and superior piano performance, than a straight-strung piano string frame of a same size. Accordingly, by using an over-strung arrangement, a large sound may be achieved from a small piano string frame, allowing a piano string frame with few and/or delicate structural elements to be sufficiently strong, stiff and stable to support any piano strings.

The piano string frame may comprise a base plate disposed on the frame plate at the bass hitch portion and connected to the frame plate via a welded joint. In other words, at the bass hitch portion, a base plate may be provided on the frame plate and any bass strings may be supported by the base plate.

In a similar way to the first beam and the second beam, a height of the base plate may extend above a height of any strings supported by the piano string frame. In particular, the base plate configured to support any bass strings may extend above a height of any treble strings. Further, in a similar way to the first beam and the second beam, the base plate may not be arranged over any strings. That is to say, in use, the base plate may not cross above any strings. Accordingly, advantages associated with the piano string frame providing a great volume of space to any strings for improved piano performance are preserved by the base plate.

By providing a welded joint, the base plate may be connected securely to the frame plate to distribute forces exerted by any bass strings evenly through the welded joint. Further a manufacture of a piano string frame comprising a base plate and may be cheap, simple and widely available.

When the piano string frame is an over-strung piano string frame, the base plate may provide the bass hitch portion with a height required to allow any bass strings to cross over at least some of any treble strings.

The second beam may be arranged perpendicular to and coplanar with the first beam. In other words, the first beam and the second beam may both be arranged on a top surface of the frame plate such that the first beam and the second beam occupy a same plane. In addition, the second beam may be arranged normal to the first beam such that, while a first beam extends along a perimeter of the frame plate, the second beam may extend substantially towards a centre of the frame plate. In this way, the second beam is arranged along at least a part of the strut.

The second beam may be connected to the first beam via a welded joint. A welded joint between the second beam and the first beam may improve a strength and stiffness of the piano string frame. Further, forces may be distributed substantially evenly through a welded joint between the first beam and the second beam. In this way, the second beam may act as a rib extending from the first beam to strengthen the frame plate by distributing load from the frame plate to the first beam.

The piano string frame may comprise a pair of side beams arranged coplanar with, perpendicular to and at opposite ends of the first beam; wherein each of the pair of side beams is connected to the frame plate via a welded joint. The pair of side beams may be arranged on a top surface of the frame plate such that the first beam and the pair of side beams occupy a same plane. In addition, the pair of side beams may arranged normal to the first beam such that each side beam of the pair of side beams extends away from the first beam along the frame plate. Further, a first side beam of a pair of side beams may be arranged at a first end of the first beam and a second side beam of a pair of side beams may be arranged at a second end of the first beam.

Accordingly, the first side beam of the pair of side beams may be arranged on the perimeter portion adjacent to the bass pin portion of the frame plate and the second side beam of the pair of side beams may be arranged on the perimeter portion adjacent to the treble pin portion of the frame plate. In other words, the first side beam and the second side beam of the pair of side beams are disposed on an outer frame edge of the frame plate at the bass pin portion and the treble pin portion respectively. In this way, the first beam and the pair of side beams may together form a U-shape around the bass and treble pin portions of the frame plate. In some embodiments, the first beam, the second beam and the pair of side beams together form an E-shape around and between the bass and treble pin portions of the frame plate. The pair of side beams may be disposed on the frame plate to define outer edges of the perimeter portion, i.e. the pair of side beams may be arranged flush with a boundary of the frame plate.

The first beam, the second beam and the pair of side beams provide strength and stiffness to the bass and treble pin portions of the piano string frame. Piano strings may be terminated at the bass pin portion and the treble pin portion in use, accordingly a tension force exerted by the strings may be effectively reacted by beams disposed in these areas of the perimeter portion of the frame plate. In this way, the arrangement of beams provides a piano string frame that may withstand tension exerted by any strings without excessive deflection.

The piano string frame may comprise a string guiding element configured to be coupled to the frame plate by a fastener; wherein the string guiding element is configured to be coupled to the frame plate between the treble pin portion and the treble hitch portion and arranged at an end of the treble pin portion configured to support a first end of a highest pitched treble string so as to provide a capo d'astro.

The string guiding element may be coupled to the frame plate by a first fastener at a first end and by a second fastener at a second end. The string guiding element may be arranged to guide some of a plurality of treble strings comprising the highest pitched treble strings. In other words, the string guiding element may be configured to guide treble strings having relatively short speaking lengths. For strings having relatively short speaking lengths, a capo d'astro may be required as suitable agraffes for these strings may not be readily available.

The string guiding element may not be large relative to the frame plate or the first beam. As such, the great volume of space provided within the piano string frame and providing improved piano performance is not significantly compromised by the string guiding element being disposed above the frame plate and any strings.

The strut may comprise a first straight section and a second straight section connected by a corner section such that the first straight section is arranged at an obtuse angle with the second straight section. In other words, the strut may comprise two straight sections linked by an elbow. The first straight section may correspond to a portion of the strut that the second beam is configured to extend along. The first straight section may extend from the first point to the corner section. The second straight section may extend from the corner section towards the treble hitch portion and the second point. The corner section may be disposed between the two separate apertures.

By providing a corner section to allow a direction of the strut to change along an extension of the strut, the first straight section of the strut may be arranged perpendicular to the first beam, and the second straight section may be arranged substantially parallel to a lowest pitched treble string. In this way, a strength and stiffness provided to the piano string frame by the strut may be adapted to the tension applied to the piano string frame by any strings, to optimise a musical performance of the piano string frame. For example, the strut may not pass underneath any treble strings.

The piano string frame may be formed of steel. Accordingly, the piano string frame may be strong and stiff. In addition, steel may be readily available, inexpensive and easy to manipulate during manufacture to produce the piano string frame. In this way, steel may enable cost-effective manufacturing of a piano string frame according to the first aspect of the invention in the UK.

According to a second aspect of the invention, there is provided a method of forming a piano string frame, the method comprising steps of: forming, from a sheet metal material, a frame plate comprising a perimeter portion enclosing an aperture, and a strut bisecting the aperture, the perimeter portion comprising a bass pin portion, a bass hitch portion, a treble pin portion and a treble hitch portion; forming, from a bar stock metal material, a first beam and a second beam; welding the first beam to the perimeter portion of the frame plate adjacent to the bass pin portion and the treble pin portion; and welding the second beam to the frame plate to extend from the first beam along at least a part of the strut.

By forming the frame plate of the piano string frame from a sheet metal material and the first beam and the second beam from a bar stock material, the materials required to form a piano string frame may be inexpensive and widely available.

By welding the first beam and the second beam to the frame plate, the first beam and the second beam may be securely connected to the frame plate. Forces exerted on the frame plate by any strings may be distributed substantially evenly through a welded joint to the first beam and the second beam. In this way, a strength and stiffness of the piano string frame may be increased. By providing a strong and stiff piano string frame formed of the frame plate and the first and second beams, no beams or bars passing over any strings supported by the piano string frame are required. Accordingly, any strings are provided a great volume of space within the piano string frame and an improved piano performance may be achieved.

In addition, by welding the first and second beams to the frame plate, the piano string frame may be manufactured in the UK. Conventional piano string frames are manufactured through casting steps. These casting steps must take place in specialist foundries of which the number in the UK is dwindling. By utilising welding steps, production of the piano string frame according to the second aspect of the invention is adaptable and uses skills that are readily available in a modern and developed workforce such as is found in the UK. Further, when compared to production through casting, production of the piano string frame through welding may be inexpensive, fast and customisable. Accordingly, personalisation of a piano string frame manufactured by welding is feasible and affordable, increasing a pace of innovation in piano design.

The step of forming a frame plate may comprise one selected from the range: laser cutting; water-jet cutting; plasma cutting; milling. The frame plate is formed from a sheet metal material. Accordingly, cutting a frame plate from a sheet metal may be performed in a number of ways. Laser cutting, water-jet cutting and plasma cutting are cost-effective and fast methods of cutting a 2D shape from a sheet metal material.

The method of forming a piano string frame may comprise a step of welding the second beam to the first beam. The second beam may be welded to the first beam to improve a strength and stiffness of the piano string frame. Further, forces may be distributed substantially evenly through a welded joint between the first beam and the second beam. In this way, the second beam may act as a rib extending from the first beam to strengthen the frame plate by distributing load from the frame plate to the first beam. By connecting the first and second beam by welding, inexpensive and readily available bar stock may be used to form the first and second beams. For example, the first and second beams may be formed of flat or rectangular bar stock. In the alternative, the first beam and the second beam may be formed as one piece.

The method of forming a piano string frame may comprise a step of welding a base plate to the perimeter portion of the frame plate at a bass hitch portion. The base plate may be welded to the frame plate to provide a raised platform for the bass hitch portion. By welding the base plate to the frame plate, the base plate may be connected securely to the frame plate to distribute forces exerted by any bass strings evenly through the welded joint. Further a manufacture of a piano string frame comprising a base plate and may be cheap, simple and widely available.

When the piano string frame is an over-strung piano string frame, the base plate may provide the bass hitch portion with a height required to allow any bass strings to cross over at least some of any treble strings. By welding a base plate to the frame plate to provide a raised platform, an over-strung arrangement of the piano string frame is enabled.

The method of forming a piano string frame may comprise a step of welding a pair of side beams to the perimeter portion of the frame plate; wherein the pair of side beams is arranged coplanar with, perpendicular to and at opposite ends of the first beam.

The pair of side beams may be welded to the frame plate to improve a strength and stiffness of the piano string frame. The pair of side beams may be welded to the first beam to further improve a strength and stiffness of the piano string frame. Forces may be distributed substantially evenly through a welded joint between the pair of side beams and the frame plate and/or the first beam. In this way, the pair of side beams may act as ribs extending from the first beam to strengthen the frame plate by distributing load from the frame plate to the first beam. By connecting the pair of side beams to the frame plate by welding, inexpensive and readily available bar stock may be used to form the pair of side beams. For example, the pair of side beams may be formed of flat or rectangular bar stock. In the alternative, the pair of side beams and the first beam may be formed as one piece.

The method of forming a piano string frame may comprise a step of fastening a string guiding element to the frame plate; wherein the string guiding element is configured to be disposed between the treble pin portion and the treble hitch portion and arranged at an end of the treble pin portion configured to support a first end of a highest pitched treble string so as to form a capo d'astro. By fastening the string guiding element to the frame plate, a capo d'astro may be removably retained on the frame plate. In this way, the string guiding element may be easy to remove, repair and/or replace.

Further, by fastening the string guiding element to the frame plate, the string guiding element may be formed separately from the frame plate and installed later. In particular, the string guiding element may be installed after any strings. In this way, any strings do not need to be threaded between the string guiding element and the frame plate during installation which may be time-consuming and therefore expensive. The string guiding element may not be a structural member configured to transfer forces from the strings to the frame plate. Further, the string guiding element may not be large relative to the frame plate or the first beam. As such, the great volume of space provided within the piano string frame and providing improved piano performance is not significantly compromised by the string guiding element being disposed above the frame plate and any strings.

The method of forming a piano string frame may comprise a step of spray painting the piano string frame. By spray painting the piano string frame, a metal construction of the piano string frame may be protected from oxidisation and surface damage. In particular, where the piano string frame comprises a steel construction, spray painting may protection the piano string frame from rust.

BRIEF DESCRIPTION OF THE DRAWINGS

Embodiments of the present invention will now be described by way of example only and with reference to the accompanying drawings, in which.

DETAILED DESCRIPTION FOR CARRYING OUT THE INVENTION

Figure 1:
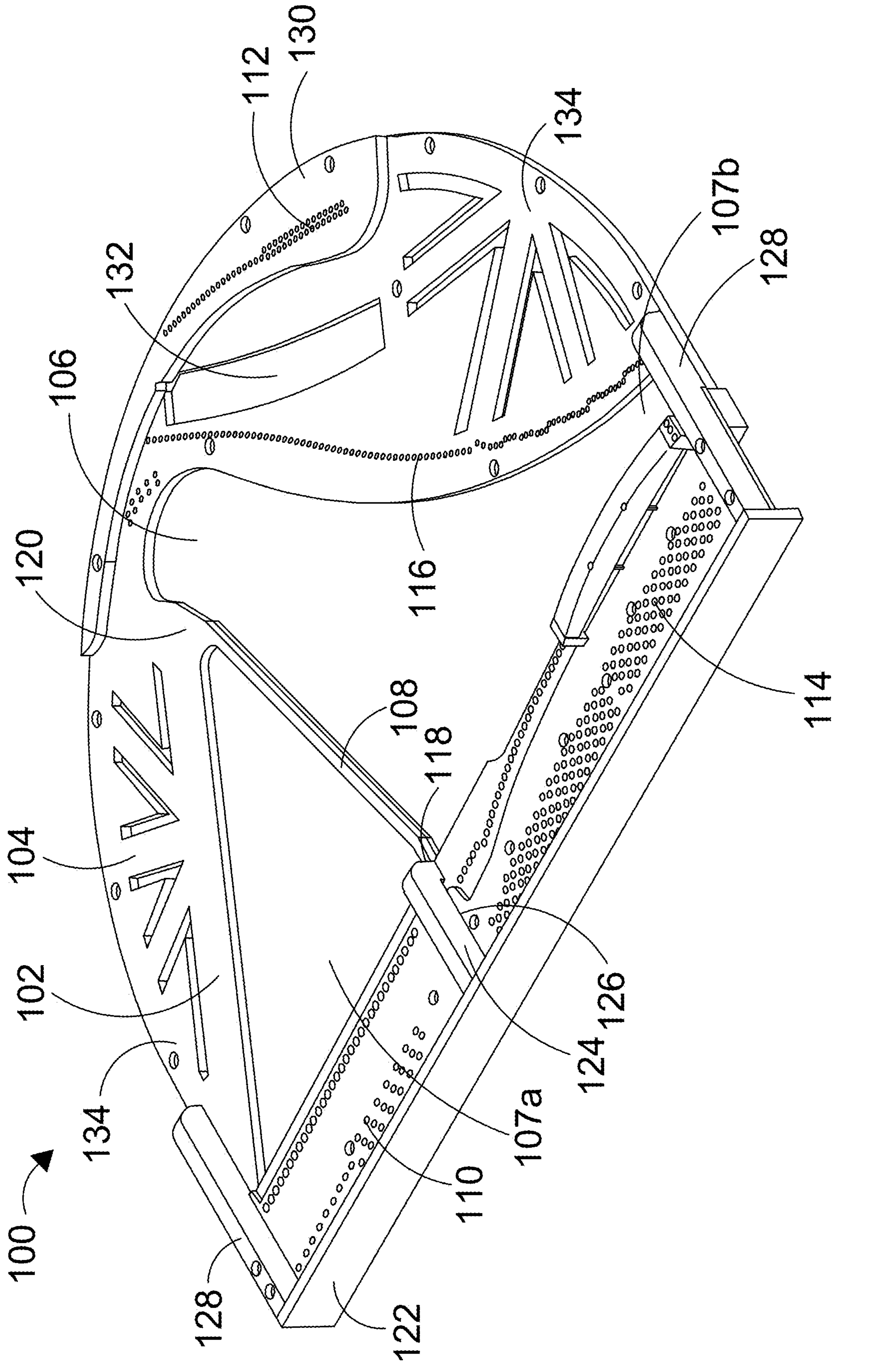
FIG. 1 depicts a schematic plan view of a piano string frame according to a first embodiment of a first aspect of the invention, in accordance with an aspect of the present disclosure.

With reference to FIG. 1, a piano string frame 100 is shown. The piano string frame 100 comprises: a frame plate 102 comprising a perimeter portion 104 enclosing an aperture 106, and a strut 108 bisecting the aperture 106; the perimeter portion 104 comprising: a bass pin portion 110 configured to support a first end of a plurality of bass strings; a bass hitch portion 112 configured to support a second end of a plurality of bass strings; a treble pin portion 114 configured to support a first end of a plurality of treble strings; and a treble hitch portion 116 configured to support a second end of a plurality of treble strings; and the strut 108 being configured to extend from a first point 118 disposed between the bass pin portion 110 and the treble pin portion 114, to a second point 120; wherein the second point 120 is disposed at an end of the treble hitch portion 116 configured to support a second end of a lowest pitched treble string, such that the strut 108 is disposed underneath any bass strings supported by the piano string frame 100, and such that no part of the frame plate 102 is disposed over any strings; and a first beam 122 disposed on the perimeter portion 104 adjacent to the bass pin portion 110 and the treble pin portion 114; and a second beam 124 disposed to extend from the first beam 122 along at least a part of the strut 108; wherein the first beam 122 and the second beam 124 are each connected to the frame plate 102 via a welded joint 126.

The piano string frame 100 of FIG. 1 comprises a substantially semi-circular shape. The first beam 122 is located along the straight edge of the semi-circle. The bass pin portion 110 and the treble pin portion 114 are located along the straight edge of the semi-circle just inside the first beam 110. Between the bass pin portion 110 and the treble pin portion 114 is the second beam 124. The second beam 124 is arranged perpendicular to the first bean 122. A pair of side beams 128 are located along the sides of the piano string frame 100, extending from the straight edge of the semi-circle in a perpendicular direction. The pair of side beams 128 flank the bass pin portion 110 and the treble pin portion 114 so that the bass pin portion 110 and the treble pin portion 114 are each surrounded on three sides by beams 122, 124, 128.

The first beam 122, the second beam 124 and the pair of side beams 128 are connected to the frame plate 102 by a welded joint 126. The welded joint 126 runs around an outer surface of the E-shaped beam assembly formed by the first beam 122, the second beam 124 and the pair of side beams 128.

From underneath the second beam 124 extends the strut 108. The strut 108 bisects the aperture 106 and splits the aperture 106 into two apertures 107*a*, 107*b*. The aperture 106 may be split into a bass aperture 106*a* located underneath any bass strings, and a treble aperture 107*b* located underneath any treble strings. A first end of the strut 108 is located on an edge of the aperture 106 located between the bass pin portion 110 and the treble pin portion 114. A second end of the strut 108 is located on an edge of the aperture 106 located at a bass end of the treble hitch portion 116. In other words, the second end of the strut 108 is located at an end treble hitch portion 116 configured to support a lowest pitched treble string. The strut 108 comprises two straight sections linked by a corner section. The first straight section is located underneath the second beam 124 and is orientated perpendicular to the first beam 122. The second section is located substantially between the bass aperture 107*a* and the treble aperture 107*b*. The corner section defines a bend in the strut 108 of approximately 14° between the first and second straight sections.

The treble hitch portion 116 has an elongated and curved shape. The edge of the treble hitch portion 116 defines an edge of the aperture 106. The bass hitch portion 112 is located behind the treble hitch portion 116. In other words, the treble hitch portion 116 is located between the bass pin portion 110 and the bass hitch portion 112 such that the piano string frame 100 is over-strung. Any bass strings may pass over at least a portion of any lowest pitched treble strings.

The bass hitch portion 112 is located on a base plate 130. The base plate 130 is located on the frame plate 102. The bass plate is located at a curved edge of the semi-circle of the piano string frame 100, opposite the straight edge of the semi-circle. The bass plate 130 has a curved shape to conform to the curved edge of the semi-circle of the piano string frame 100. The base plate 130 is a raised platform such that the bass hitch portion 112 is located higher than a treble hitch portion 116. In this way, any bass strings may be arranged higher than any treble strings and may pass over the treble strings to enable an over-strung arrangement of the piano string frame 100.

Between the bass hitch portion 112 and the treble hitch portion 116 is located a bass bridge aperture 132. In use, a bass bridge of the piano may be disposed through the bass bridge aperture 132 to define a speaking length at the hitch end of any bass strings. In use, a treble bridge may be disposed through the treble aperture 107*b* to define a speaking length at the hitch end of any treble strings.

The frame plate 102 may comprise areas of webbing 134. The webbing 134 may comprise apertures to increase an exposure of any strings supported by the piano string frame 100 to any soundboard located underneath the piano string frame 100.

The piano string frame 100 does not comprise any bars, braces or struts that, in use, are located above any strings supported by the piano string frame 100. In fact, in use, no part of the frame plate 102 has a height that extends above, i.e. is greater than, a height of a lowest portion of the strings. A height of the base plate 130 extend above at least a portion of the strings in use. That is to say, a height of the base plate 130 is greater than a height of a lowest portion of the strings.

Heights of the first beam 122 and the second beam 124 extend above the strings in use. That is to say, heights of the first beam 122 and the second beam 124 are greater than a height of any portion of the strings. In this way, any lid of the piano may be closed onto the first beam 122 and the second beam 124 without interfering with any strings.

Figure 2:
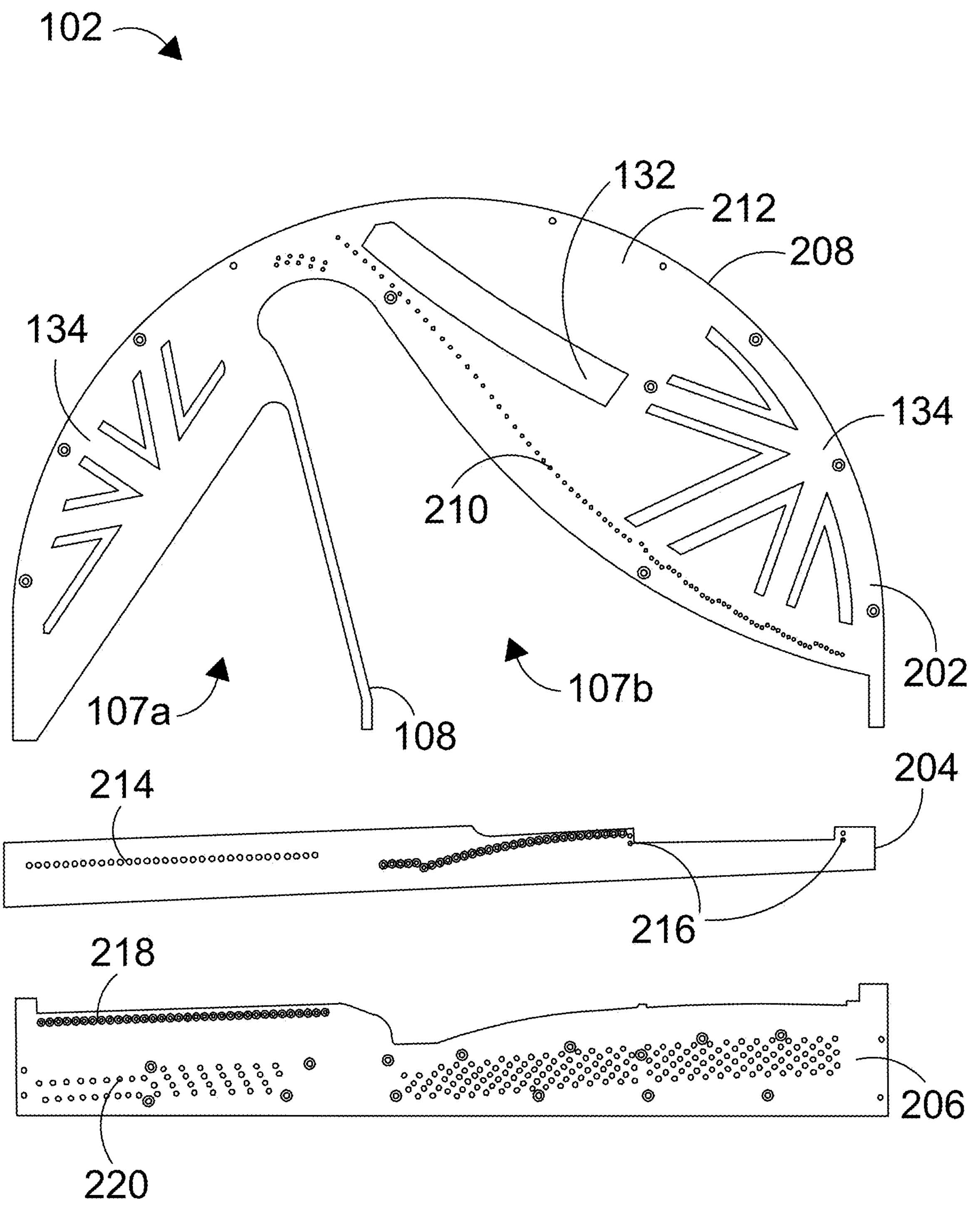
FIG. 2 depicts a schematic plan view of a frame plate of the piano string frame of FIG. 1, in accordance with an aspect of the present disclosure.

With reference to FIG. 2, a frame plate 102 of the piano string frame 100 of FIG. 1 is shown. The frame plate 102 is formed from a hitch plate portion 202, a first pin plate portion 204 and a second pin plate portion 206.

The hitch plate portion 202 is configured to support hitch pins for any plurality of strings supported by the piano string frame 100. The hitch plate portion 202 is the largest portion of the frame plate 102 and comprises a curved edge 208. Into the hitch plate portion 202 are cut the apertures 107*a*, 107*b*, the bass bridge aperture 132 and various further apertures in the areas of webbing 134. A plurality of holes 210 being configured to receive hitch pins are cut into the hitch plate portion 202. The hitch plate portion 202 comprises a space 212 configured to receive the base plate 130. The hitch plate portion 202 comprises the strut 108. The strut 108 may be formed integrally with the hitch plate portion 202, or may be connected to the hitch plate portion 202 via a welded joint (not shown).

The first pin plate portion 204 is configured to support a plurality of agraffes and a capo d'astro. The first pin plate portion 204 has a substantially elongated shape. A plurality of holes 214 being configured to receive agraffes are cut into the first pin plate portion 204. Further holes 216 configured to receive fasteners configured to fasten the capo d'astro to the first pin plate portion 204 are provided.

The second pin plate portion 206 is configured to support tuning pins for any plurality of strings supported by the piano string frame 100. The second pin plate portion 206 has a substantially elongated shape. A plurality of holes 218 being configured to align with some of the holes 214 of the first pin plate portion 204 and configured receive agraffes are cut into the second pin plate portion 206. A plurality of holes 220 being configured to receive tuning pins are cut into the second pin plate portion 206.

The first and second pin plate portions 204, 206 are connected together by a welded joint (not shown). When connected together by a welded joint, the first and second pin plate portions 204, 206 are configured to be at least partially overlapping. The first and second pin plate portions 204, 206 are connected to the hitch plate portion 202 by a same or a further welded joint (not shown). The first and second pin plate portions 204, 206 are connected to the hitch plate portion 202 at an edge of the hitch plate portion 202 comprising open edges of the apertures 107*a*, 107*b* to close the apertures 107*a*, 107*b*. Accordingly, the first and second pin plate portions 204, 206 are connected to the hitch plate portion 202 at opposing sides of the edge of the hitch plate portion 202 and at the distal end of the strut 108. In this way, the strut 108 is connected to the first and second pin plate portions 202, 204 by a welded joint to provide a load distribution path disposed between the bass pin portion 110 and the treble pin portion 114 and substantially centrally to the first and second pin plate portions 202, 204.

Figure 3:
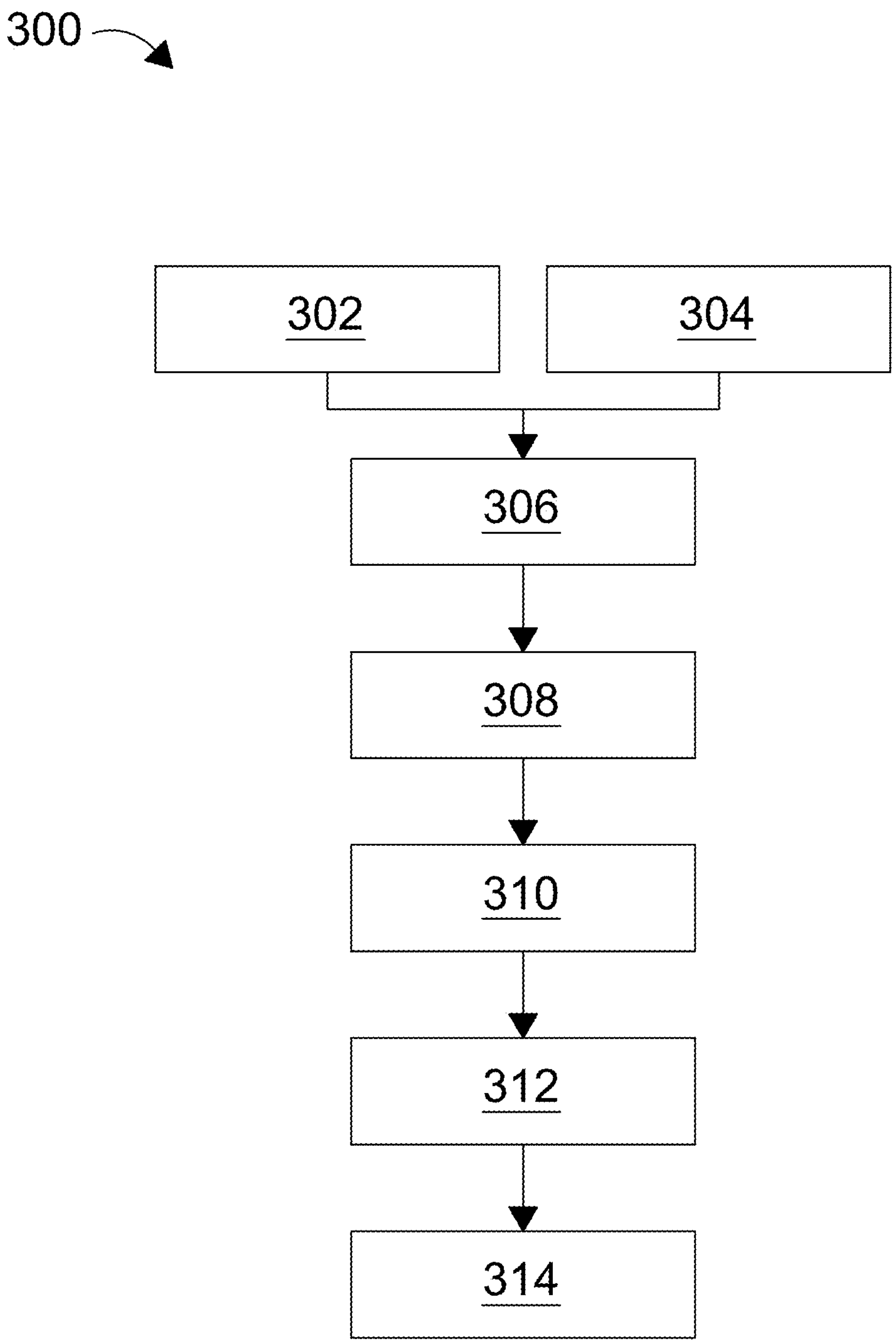
FIG. 3 depicts a flowchart of a method of forming the piano string frame of FIG. 1 according to a first embodiment of a second aspect of the invention, in accordance with an aspect of the present disclosure.

With reference to FIG. 3, a flowchart 300 of a method of forming a piano string frame 100 is shown. The flowchart comprises simultaneous forming steps 302, 304 of forming, from a sheet metal material, a frame plate 102 comprising a perimeter portion 104 enclosing an aperture 106, and a strut 108 bisecting the aperture 106, the perimeter portion 104 comprising a bass pin portion 110, a bass hitch portion 112, a treble pin portion 114 and a treble hitch portion 116, and forming, from a bar stock metal material, a first beam 122 and a second beam 124. Following forming steps 302, 304, welding step 306 of welding the first beam 122 to the perimeter portion 104 of the frame plate 102 adjacent to the bass pin portion 110 and the treble pin portion 114 is performed. Then welding step 308 of welding the second beam 124 to the frame plate 102 to extend from the first beam 122 along at least a part of the strut 108 is performed. Welding step 310 of welding a base plate 130 to the perimeter portion 104 of the frame plate 102 at a bass hitch portion 112 follows. Final welding step 312 of welding a pair of side beams 128 to the perimeter portion 104 of the frame plate 102, wherein the pair of side beams 128 is arranged coplanar with, perpendicular to and at opposite ends of the first beam 122, completes the piano string frame 100 structure. Coating step 314 of spray painting the piano string frame 100 finishes the piano string frame 100.

Forming step 302 may comprise one selected from the range: laser cutting; water-jet cutting; plasma cutting; milling. Welding steps 306 or 308 may further comprise a step of welding the second beam 124 to the first beam 122. Welding steps 306, 308, 310 and 312 may take place in any order or simultaneously.

Further embodiments within the scope of the present invention may be envisaged that have not been described above, for example, the piano string frame may be used in any suitable piano, any suitable keyboard instrument, or any suitable struck or plucked stringed instrument. Further, the piano string frame may be configured to support any number of strings. The piano string frame may support piano strings in any suitable manner. The piano string frame may comprise any number of struts comprising any number of portions, as long as they are arranged lower than or underneath any strings. The piano string frame may comprise any number of beams connected to the frame plate by welded joints, as long as they are not arranged to overlap any strings. The welded joints may be formed in any suitable way. The piano string frame may be formed of any suitable steel, or further any suitable material. The piano string frame may be finished in any suitable way, for example the piano string frame may be powder coated.

To provide a strong, stiff and stable piano string frame while providing a great volume of open space to any strings supported by the piano string frame, an innovative piano string frame design is required. The present invention provides improved exposure of any strings, improved strength, stiffness and stability of the piano string frame, and improved cost, time and availability of manufacture in the UK. The invention is not limited to the specific examples or structures illustrated, a greater number of components than are illustrated in the figures could be used, for example.

The invention claimed is:

1. A piano string frame comprising:

a frame plate comprising a perimeter portion enclosing an aperture, and a strut bisecting the aperture; the perimeter portion comprising:

a bass pin portion configured to support a first end of a plurality of bass strings;

a bass hitch portion configured to support a second end of a plurality of bass strings;

a treble pin portion configured to support a first end of a plurality of treble strings; and a treble hitch portion configured to support a second end of a plurality of treble strings; and the strut being configured to extend from a first point disposed between the bass pin portion and the treble pin portion, to a second point;

wherein the second point is disposed at an end of the treble hitch portion configured to support a second end of a lowest pitched treble string, such that the strut is disposed underneath any bass strings supported by the piano string frame, and such that no part of the frame plate is disposed over any strings; and a first beam disposed on the perimeter portion adjacent to the bass pin portion and the treble pin portion; and a second beam disposed to extend from the first beam along at least a part of the strut;

wherein the first beam and the second beam are each connected to the frame plate via a welded joint.

2. The piano string frame according to claim 1, wherein the treble hitch portion is disposed substantially between the bass hitch portion and the bass pin portion to provide an over-strung piano string frame.

3. The piano string frame according to claim 1, comprising a base plate disposed on the frame plate at the bass hitch portion and connected to the frame plate via a welded joint.

4. The piano string frame according to claim 1, wherein the second beam is arranged perpendicular to and coplanar with the first beam.

5. The piano string frame according to claim 1, further comprising a pair of side beams arranged coplanar with, perpendicular to and at opposite ends of the first beam;

wherein each of the pair of side beams is connected to the frame plate via a welded joint.

6. The piano string frame according to claim 1, further comprising a string guiding element configured to be coupled to the frame plate by a fastener;

wherein the string guiding element is configured to be coupled to the frame plate between the treble pin portion and the treble hitch portion and arranged at an end of the treble pin portion configured to support a first end of a highest pitched treble string so as to provide a capo d'astro.

7. The piano string frame according to claim 1, wherein the strut comprises a first straight section and a second straight section connected by a corner section such that the first straight section is arranged at an obtuse angle with the second straight section.

8. The piano string frame according to claim 1, wherein the piano string frame is formed of steel.

9. A method of forming a piano string frame, the method comprising:

forming, from a sheet metal material, a frame plate comprising a perimeter portion enclosing an aperture, and a strut bisecting the aperture, the perimeter portion comprising a bass pin portion, a bass hitch portion, a treble pin portion and a treble hitch portion;

forming, from a bar stock metal material, a first beam and a second beam;

welding the first beam to the perimeter portion of the frame plate adjacent to the bass pin portion and the treble pin portion; and welding the second beam to the frame plate to extend from the first beam along at least a part of the strut.

10. The method of forming a piano string frame according to claim 9, wherein the step of forming a frame plate comprises one selected from the range: laser cutting; water-jet cutting; plasma cutting; milling.

11. The method of forming a piano string frame according to claim 9, further comprising a step of welding the second beam to the first beam.

12. The method of forming a piano string frame according to claim 9, further comprising a step of welding a base plate to the perimeter portion of the frame plate at a bass hitch portion.

13. The method of forming a piano string frame according to claim 9, further comprising a step of welding a pair of side beams to the perimeter portion of the frame plate;

wherein the pair of side beams is arranged coplanar with, perpendicular to and at opposite ends of the first beam.

14. The method of forming a piano string frame according to claim 9, further comprising a step of fastening a string guiding element to the frame plate;

wherein the string guiding element is configured to be disposed between the treble pin portion and the treble hitch portion and arranged at an end of the treble pin portion configured to support a first end of a highest pitched treble string so as to form a capo d'astro.

15. The method of forming a piano string frame according to claim 9, further comprising a step of spray painting the piano string frame.

* * * * *